(12) United States Patent
Kontsevich

(10) Patent No.: US 8,914,866 B2
(45) Date of Patent: *Dec. 16, 2014

(54) SYSTEM AND METHOD FOR USER AUTHENTICATION BY MEANS OF WEB-ENABLED PERSONAL TRUSTED DEVICE

(75) Inventor: Leonid Kontsevich, San Francisco, CA (US)

(73) Assignee: Envizio, Inc., San Francisco, CA (US)

( * ) Notice: Subject to any disclaimer, the term of this patent is extended or adjusted under 35 U.S.C. 154(b) by 213 days.

This patent is subject to a terminal disclaimer.

(21) Appl. No.: 13/009,861

(22) Filed: Jan. 20, 2011

(65) Prior Publication Data

US 2012/0192260 A1    Jul. 26, 2012

Related U.S. Application Data

(60) Provisional application No. 61/296,466, filed on Jan. 19, 2010.

(51) Int. Cl.
| | | |
|---|---|---|
| *H04L 9/32* | (2006.01) | |
| *G06F 21/42* | (2013.01) | |
| *G06F 21/34* | (2013.01) | |

(52) U.S. Cl.
CPC ............ *H04L 9/3213* (2013.01); *H04L 9/3234* (2013.01); *H04L 9/3231* (2013.01); *G06F 21/42* (2013.01); *G06F 21/34* (2013.01)
USPC ............................................................ 726/9

(58) Field of Classification Search
CPC ................................................... H04L 9/3213
USPC .............................................................. 726/9
See application file for complete search history.

(56) References Cited

U.S. PATENT DOCUMENTS

| | | | |
|---|---|---|---|
| 5,053,955 | A | 10/1991 | Peach et al. |
| 5,056,019 | A | 10/1991 | Schultz et al. |
| 5,664,115 | A | 9/1997 | Fraser |
| 5,664,625 | A | 9/1997 | Letrange et al. |
| 5,857,175 | A | 1/1999 | Day et al. |
| 8,326,658 | B1 | 12/2012 | Lee et al. |

(Continued)

FOREIGN PATENT DOCUMENTS

| | | |
|---|---|---|
| WO | WO-9933012 A1 | 7/1999 |
| WO | WO-0223438 A2 | 3/2002 |

(Continued)

OTHER PUBLICATIONS

Lee, Ye., "Interface Design for Mobile Commerce", Communications of ACM; pp. 48-53 (2003).

(Continued)

*Primary Examiner* — Jacob Lipman
(74) *Attorney, Agent, or Firm* — Paul Davis; Mintz Levin

(57) ABSTRACT

A system of token-based user authentication for the purpose of authorizing user access to protected resources, such as web applications, computer systems or computer controlled devices. The system utilizes a personal trusted device (PTD), which is owned and operated by one specific user, to establish secure communication channels that are subsequently used to pass user credentials to authentication service. Association of a PTD with servers controlling access to resources is performed by publishing and capturing unique tokens via sensors embedded in PTD, such as an optical camera.

12 Claims, 2 Drawing Sheets

(56) References Cited

U.S. PATENT DOCUMENTS

| | | |
|---|---|---|
| 2002/0023215 A1 | 2/2002 | Wang et al. |
| 2002/0091571 A1 | 7/2002 | Thomas et al. |
| 2003/0212595 A1 | 11/2003 | Antonucci |
| 2004/0210486 A1 | 10/2004 | Carapelli |
| 2005/0075927 A1 | 4/2005 | Nash |
| 2007/0162341 A1 | 7/2007 | McConnell et al. |
| 2008/0209534 A1* | 8/2008 | Keronen et al. .......... 726/9 |
| 2009/0023476 A1 | 1/2009 | Saarisalo et al. |
| 2009/0132405 A1 | 5/2009 | Scipioni et al. |
| 2010/0250351 A1 | 9/2010 | Gillenson et al. |
| 2011/0029370 A1 | 2/2011 | Roeding et al. |
| 2011/0112898 A1 | 5/2011 | White |
| 2011/0246284 A1 | 10/2011 | Chaikin et al. |
| 2012/0029691 A1 | 2/2012 | Mockus et al. |
| 2012/0192260 A1 | 7/2012 | Kontsevich |

FOREIGN PATENT DOCUMENTS

| | | |
|---|---|---|
| WO | WO-2007048008 A2 | 4/2007 |
| WO | WO-2012113756 A1 | 8/2012 |
| WO | WO-2012177766 A1 | 12/2012 |

OTHER PUBLICATIONS

Mok, Swee Mean, "Media Searching on Mobile Devices", IEEE; 17-20; pp. 126-129 (May 2007).

Borning, S., Shoot & Copy: Phonecam-based Information Transfer from Public Displays onto Mobile Phones, University of Munich, Media Informatics; pp. 1-8 (2007).

Kostakos, V., "NFC on Mobile Phones: Issues, Lessons and Future Research", PerCom Workshop, pp. 1-4 (2007).

* cited by examiner

SYSTEM AND METHOD FOR USER AUTHENTICATION BY MEANS OF WEB-ENABLED PERSONAL TRUSTED DEVICE

CROSS REFERENCE TO RELATED APPLICATIONS

The present application claims benefit of U.S. Provisional Patent Application No. 61/296,466 filed on Jan. 19, 2010, entitled "System and method for secure website login by means of web-enabled personal trusted device" listing the same inventors, the disclosure of which is hereby incorporated by reference.

FIELD OF THE INVENTION

The invention relates generally to the field of information security and relates specifically to user authentication for the purpose of authorization of access to restricted resources.

BACKGROUND OF THE INVENTION

In the modern environment where an individual can gain access to restricted resources, the user authentication becomes a central issue. A widely accepted solution to this problem is based on a combination of the unique login name and the password, which no one but their owner is supposed to know. This solution is not safe: a malicious party may successfully guess or inconspicuously record this information (for instance, with key logging or phishing techniques), and then use it to impersonate the legitimate user and gain access to restricted resources.

There exist a number of approaches that address such a security issue with login names and passwords. Most of these approaches are based on a one-time password or code that can be different for every authentication attempt. Typically, such approaches require specialized hardware. For instance, security tokens often designed as key fobs generate synchronous dynamic passwords with an algorithm kept in tight secret. This password can be independently reproduced by the authenticating authority and matched with a supplied one. More sophisticated security tokens may make use of biometric devices, such as a fingerprint scanner, which guarantees more rigorous authentication. These tokens, however, usually are proprietary and provide authentication for only one resource provider; more universal solution is in demand.

There is another problem for authentication with user name and password. Over time, users typically end up with a number of different login names and passwords, because sometimes a previously used user name is taken, or a previously used password is not deemed as sufficiently secure by an authentication authority. At certain point such a variety of user names and passwords becomes hard to remember and manage. There exist software solutions where users can store user names and passwords, and use a master password for accessing the list. This can be dangerous from the security perspective, as if a malicious party gains access to its content, it gets access to all resources available to the owner. There is a need, therefore, in a single secure authentication solution, which would handle access to multiple resources without significant security compromise.

SUMMARY OF THE INVENTION

A system of token-based authentication meets the needs of user authentication for the purpose of authorizing access via action servers to protected resources. To perform authentication, an action server sends a request for authentication to an authentication service, which will keep the request until it is completed or expired, and sends request for a new token to a token management service. A unique token is then generated by the token management service, and is presented via a token presentation device to the user, who then scans the token with his or her personal trusted device (PTD). The PTD transmits a message via encrypted communication channel, containing its unique identifier and the scanned token, to the token management service. The token management service notifies the authentication service of the response from PTD. The authentication service queries PTD via encrypted channel for user credentials. PTD passes a query to the user, the user enters the credentials via PTD's embedded input devices, and PTD transmits the entered credentials to the authentication service via encrypted channel. The authentication service checks user credentials, and upon successful match notifies action server via encrypted communication channel that authentication has been successfully completed. The action server may than allows the user to access the protected resources.

DETAILED DESCRIPTION OF THE PREFERRED EMBODIMENT

Figure 1:
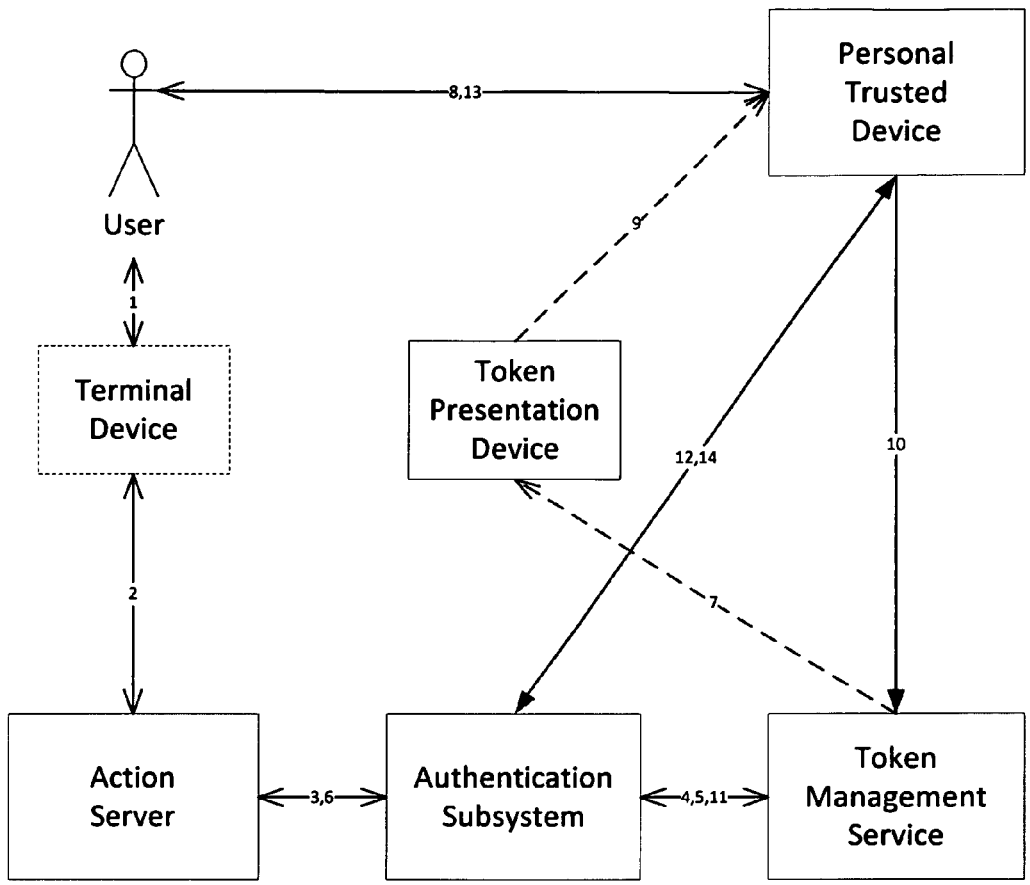
FIG. 1 describes communication between the components of token-based authentication system.
Figure 2:
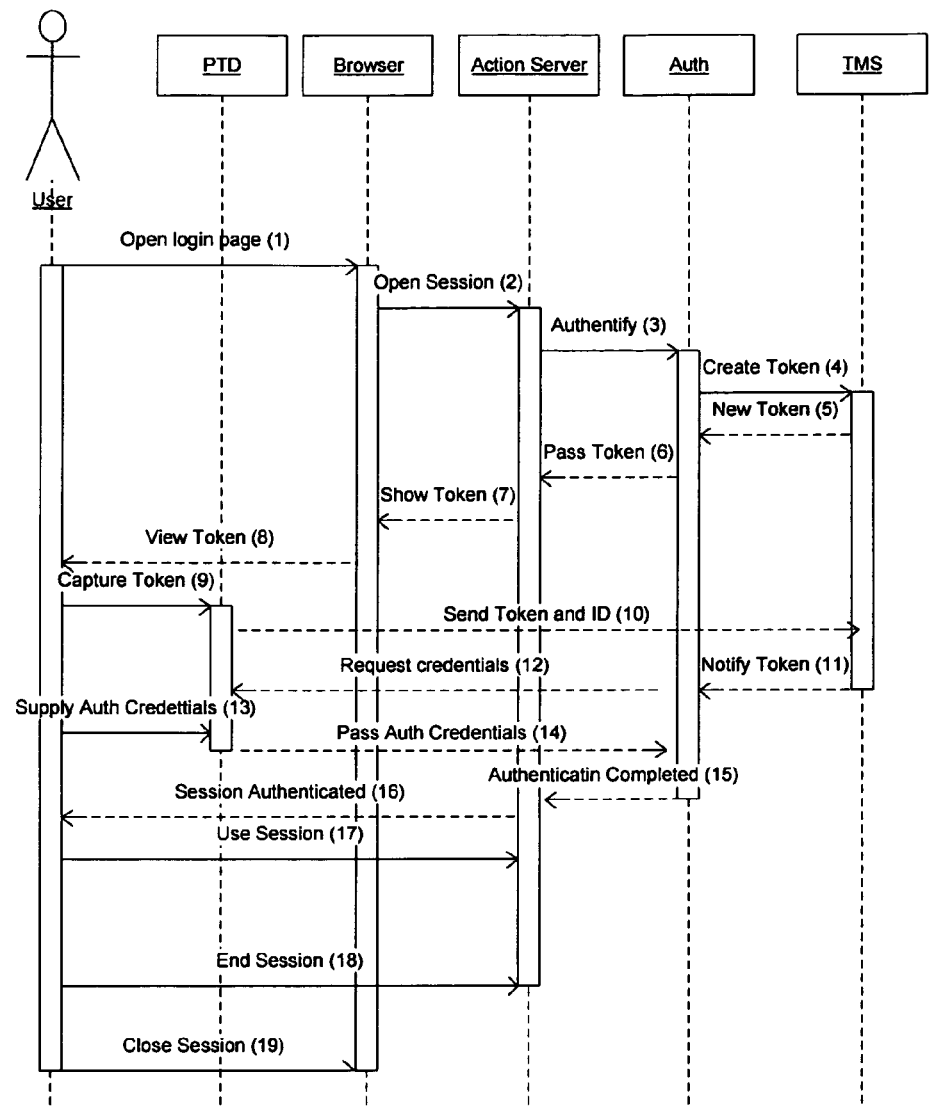
FIG. 2 is a sequence diagram of a specific illustrative embodiment of the token-based authentication system.

In this specific embodiment the action server is a web server, which serves a web application that requires user authentication in a web browser (terminal device). The embodiment is illustrated with FIGS. 1 and 2. The sequence of events in this embodiment is as follows:

1. The user opens the login page of a web application in the browser (arrow 1 in FIG. 1, arrow 1 in FIG. 2).
2. The web browser opens a session (FIG. 1, arrow 2; FIG. 2, arrow 2) on a web server.
3. Action server creates an authentication request (FIG. 1, arrow 3; FIG. 2, arrow 3) and sends it to authentication service.
4. Authentication service requests a token from a token management service (FIG. 1, arrow 4; FIG. 2, arrow 4).
5. Token management service issues a token (FIG. 1, arrow 5; FIG. 2, arrow 5).
6. The token is passed through the action server (FIG. 1, arrow 6; FIG. 2, arrow 6) to the web browser (FIG. 1, arrow 7; FIG. 2, arrow 7).
7. The token is viewed by the user (FIG. 1, arrow 8, FIG. 2, arrow 8) and is captured by a personal trusted device (FIG. 1, arrow 9; FIG. 2, arrow 9).
8. The PTD sends a message with captured token and the PTD UDID to the token management service (FIG. 1, arrow 10; FIG. 2, arrow 10).
9. Token management service notifies authentication service (FIG. 1, arrow 11; FIG. 2, arrow 11).
10. Authentication service request user credentials from the PTD (FIG. 1, arrow 12; FIG. 2, arrow 12).
11. User supplies credentials (FIG. 1, arrow 13; FIG. 2, arrow 13), which are passed by PTD to authentication service (FIG. 1, arrow 14; FIG. 2, arrow 14).
12. Authentication service notifies the web server of successfully completed authentication (FIG. 2, arrow 15).

13. The authenticated user uses the web application (FIG. 2, arrows 16, 17, 18, 19).

14. For certain sensitive web applications, such as banking and finance, the steps 3-15 may be repeated more than once during the user session.

The invention claimed is:

1. A token-based user authentication system, comprising:

a processor for a token management service that in operation creates one or more unique tokens that are scannable digital sequences of information relating to items purchased by a user and presented during product purchase check-out by a consumer, an authentication subsystem included in the token management service that requests and receives authentication information from a user's Personal Trusted Device (PTD) in response to requests by the user or is read from non-volatile memory of the PTD, the PDT being in communication with a token management service, the PTD in operation capturing tokens received from the management service using an embedded capture device by communication via wireless or wired digital networks, the PTD possessing a unique device identifier (UDID) capable of capturing short digital sequences (tokens) via digital signal processing of optical, audio, or radio-frequency input; accepting user input needed for user authentication with embedded keyboard, touch sensors, optical sensor, or voice recognition; transmitting and receiving messages via network connection, a plurality of Token Presentation Devices coupled to the token management system that allow users to capture tokens with a user's mobile device;

a plurality of network-connected Action Servers act on behalf of users and require the users to be identified and authenticated; and a Network-connected Token Management Service that facilitates token-based authentication by:

generating unique tokens upon requests coming from an Authentication Service on behalf of the Action Servers; receiving messages from PTDs that contain PTDs' UDIDs and the tokens captured by PTDs from Token Presentation Devices; establishing links between said tokens and UDIDs of the PTDs that sent the messages with the tokens; notifying the Authentication Service about the newly established links, a processor for an Authentication Service that: communicates with PTDs and provides authentication of users, and authenticates users, a PTD sending a message with a captured token to the token management service, the token management service notifies the authentication service, the PTD passes user credentials to the authentication service and the authentication service provides notification of a completed authentication, the Authentication service maintaining a database of the user records containing a unique user identifier, UDID's of the PTDs owned by the user, user credentials, and user identifiers for Servers, the Authentication Service providing an interface to the Action Servers that allows association of a user identifier on an Action Server using a user record in the database providing an interface to the Action Servers that allows initiation of token-based authentication, notifies an Action Server in the event when token-based authentication previously initiated on behalf of that Action Server has been successfully completed using a combination of the user credentials and the use of PTD associated with a user's record.

2. The token-based user authentication system of claim 1, wherein a network-connected Action Server is a computer system serving web applications that require user authentication.

3. The token-based user authentication system of claim 1, wherein a network-connected Action Server is a login subsystem of a computer operating system.

4. The token-based user authentication system of claim 1, wherein a network-connected Action Server is a software program that requires user authentication.

5. The token-based user authentication system of claim 1, wherein a network-connected Action Server is an actuator of a physical process selected from at least one of, operation of locks, switches, alarm systems, industrial equipment, machinery, and other automation systems.

6. The token-based user authentication system of claim 1, wherein a network-connected Action Server controls access to weapon systems.

7. The token-based user authentication system of claim 1, wherein the PTD is selected from at least one of, a mobile phone, tablet PC, Personal Digital Assistant (PDA), and portable media player device.

8. The token-based user authentication system of claim 7, wherein the token is transmitted to the PTD with an embedded camera via an optical channel.

9. The token-based user authentication system of claim 7, wherein the token is transmitted to the PTD with an embedded microphone via audio channel.

10. The token-based user authentication system of claim 7, wherein the token is transmitted to the PTD with an embedded near-field communication device via radio frequency.

11. The token-based user authentication system of claim 8, wherein a Token Presentation Device is a monitor controlled by at least one of, a computer, mobile phone, tablet PC, PDA, portable media player, TV set, point of sale terminal, digital projection system and other display device capable of presenting an optical representation of the token.

12. The token-based user authentication system of claim 8, wherein a Token Presentation Device is a hard copy of an token optical representation.

* * * * *